Nov. 29, 1960   M. DE ANGELO   2,961,919
SYSTEM OF PRODUCING AND REPRODUCING SOUND MOTION PICTURES
Filed Aug. 12, 1957
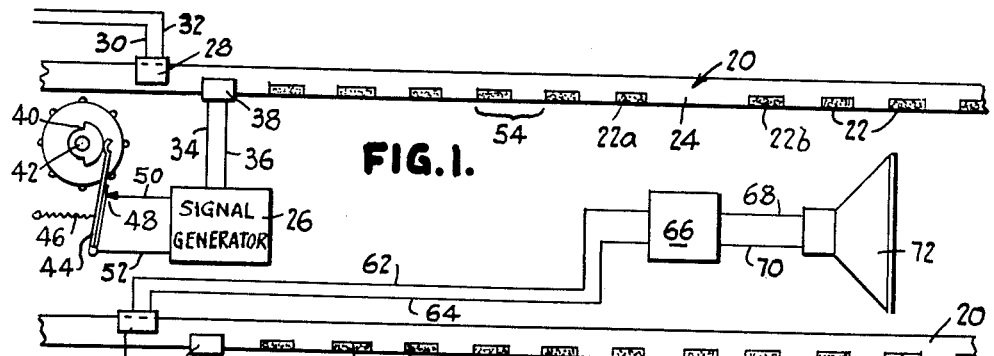
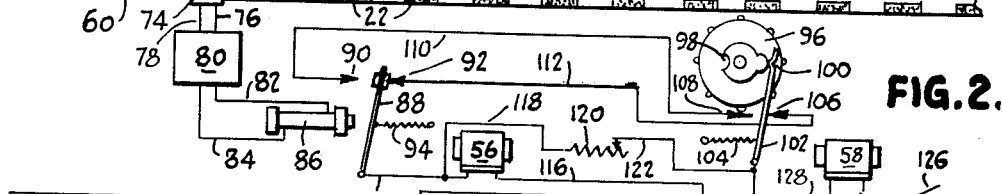
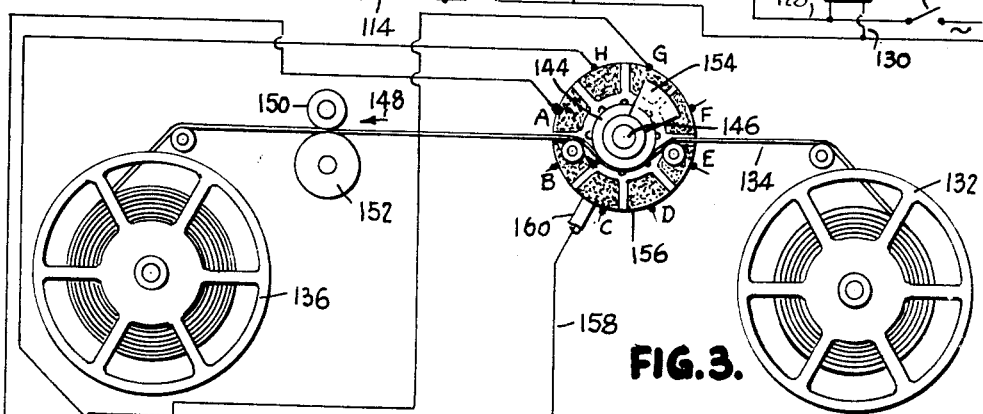
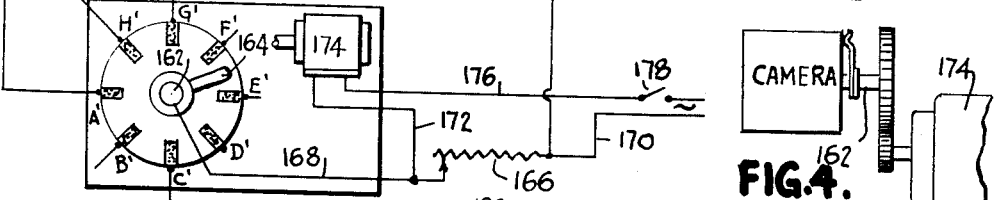
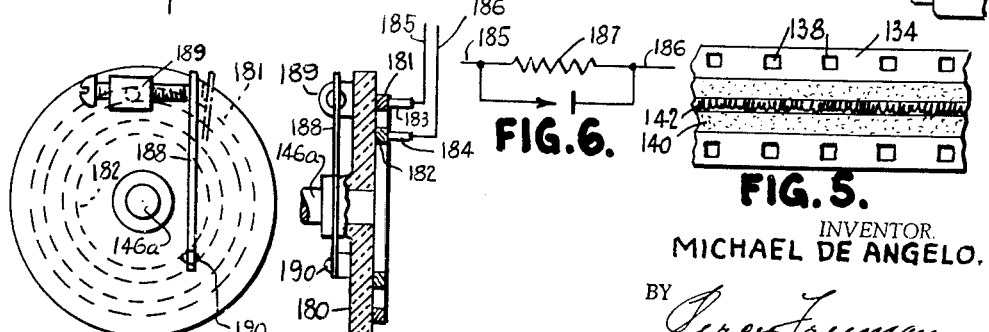
INVENTOR.
MICHAEL DE ANGELO.
BY Percy Freeman
ATTORNEY.

2,961,919

SYSTEM OF PRODUCING AND REPRODUCING SOUND MOTION PICTURES

Michael De Angelo, 146—29 Laburnam Ave., Flushing, N.Y.

Filed Aug. 12, 1957, Ser. No. 677,431

2 Claims. (Cl. 88—16.2)

This invention relates to a method of and means for producing sound motion pictures and also for synchronizing motion pictures and a sound accompaniment and is a continuation-in-part of my application Serial No. 301,414, filed July 28, 1952, now abandoned.

Heretofore, in order for the average amature to make sound pictures, it would be necessary for him to obtain expensive, professional and complicated apparatus. It is extremely desirable that an amateur have available inexpensive apparatus and means for producing talking motion pictures.

Besides, motion picture films are frequently produced without sound accompaniment and it is found necessary or desirable, at times, to dub sound effects therein. This may be done by simply running off a previously made film in a conventional projector and simultaneously running off a sound accompaniment on a sound-film-reproducing machine. It has not thus far been found possible to synchronize the film and the sound by simple, inexpensive means. Nor, in fact has it been possible, so far as I am aware, to make sound pictures with 8 mm. film.

It is accordingly the principal object of this invention to provide a simple and inexpensive method of and means for taking motion pictures and to record sound simultaneously but on different devices and also to provide simple and inexpensive methods and means for synchronizing the motion picture film projection with the rendition of the sound accompaniment therefor. It is a corollary object of this invention, therefore, to provide means for synchronizing the operation of a motion picture projector with the operation of a sound reproducer.

Briefly, this invention comprises for reproduction, the use of two electric motors, one driving the motion picture projector and the other driving the sound reproducer. The motor which drives the sound reproducer is a constant speed motor which operates the sound reproducing apparatus at a constant unvarying speed. The variable speed motor which operates the projector is adjusted preferably to lag slightly behind the sound reproducing motor. At certain intervals, the lagging projector motor is caused to speed up in order to catch up with the sound motor. When it lags too far behind again, it is again given a new impetus and this process or cycle is repeated time and time again throughout the entire performance. It is important that the sound reproducing apparatus be run at a constant speed since variations in its speed would very quickly and readily be detected by the audience. This is not quite true of the film projecting apparatus since minor variations in its speed of operation would go entirely unnoticed.

One form of this invention, which is especially adapted for dubbing sound with a tape recorder, comprises the use of a sound tape having a plurality of control signals, previously applied thereto in spaced repetitive relation. This method also applies when making sound pictures initially, but in such case the application of control signals is controlled by the camera. The motor which drives the sound reproducing apparatus is connected to the usual source of electric current. The variable speed motor which drives the projector, on the other hand, is connected in series with a resistance or an electrical speed controlling governor which tends to reduce the power of said motor with a consequent lag in rotational speed. At frequent intervals, the resistance or governor is short-circuited out of the circuit of said projector-driving motor and the speed of said motor accordingly increases momentarily, that is, until the resistance or governor is automatically brought into the circuit again.

For reproduction the above mentioned control signals would be used to energize a relay in intermittent fashion. This relay would actuate a first switch, and the projector would actuate a second switch and these two switches would control the resistance or governor circuit in the same manner as has been described.

When the resistance or the governor is in the circuit of the projector motor, said motor tends to lag behind the sound reproducer motor. When the resistance or governor is short-circuited out of said circuit, the projector motor speeds up sufficiently to catch up with the sound reproducer motor. This process or cycle continues intermittently from the beginning to the end of the entire performance.

Obviously, the control signals may comprise areas of electrically conductive material on the tape, or other means carried by the tape to close or open electrical circuits to operate a relay.

Another method of accomplishing the same result involves the use of a perforated sound recording film which drives a sprocket. A rotating brush is connected to the sprocket for engagement with a plurality of uniformly spaced contacts arranged concentrically of the axial center of said brush and said sprocket and when any of said contacts are bridged by the brush, provision is made for the closing of a circuit, subject only to the engagement of a second rotatably-mounted brush and a second plurality of spaced contacts arranged concentrically of the axial center of said brush and said sprocket and when any of said contacts are bridged by the brush, provision is made for the closing of a circuit, subject only to the engagement of a second rotatably-mounted brush and a second plurality of spaced contacts arranged concentrically of the axial center of said second brush when contact is made simultaneously by both brushes, the resistance or governor is short-circuited out of the circuit of the motor which drives the projector. There are other ways of achieving this result, using other means by following the same principle.

What has above been said with respect to the projection of motion pictures and to the reproduction of a sound accompaniment also applies with equal validity to the taking of motion pictures and the recording of a sound accompaniment. It is necessary to bear in mind in all cases that the motor which drives the sound recording mechanism must rotate at a constant speed. The motor which drives the camera may lag in speed behind the motor which drives the sound recording mechanism and the camera motor may be given short bursts of speed to catch up with the sound recorder motor.

This invention relates to both systems, the one relating to the filming of motion pictures and the recording of a sound accompaniment and the other relating to the projecting of said motion pictures and the reproducing of said sound accompaniment.

Preferred forms of this invention are shown in the accompanying drawing, in which:

Fig. 1 is a somewhat diagrammatic view showing how a sound track is magnetically applied to a tape or band and showing how spaced control signals are incorporated into said tape or band for the purpose of synchronizing the projector and sound reproducer motors in the manner shown in Fig. 2.

Fig. 2 is another diagrammatic view showing how the control signals on the tape or band are enabled to control a relay which in turn controls a switch, a cam-controlled switch being also shown on projector which cooperates with the relay-controlled switch to short circuit a resistance (or a governor) out of the circuit of the motor which drives the projector.

Fig. 3 is still another diagrammatic view showing a sound band which actuates a rotary switch that cooperates with a second rotary switch to short-circuit a resistance (or governor) out of the circuit of a motor which drives a motion picture camera, the principle being the same as above described, namely with a constant speed sound recording motor and a lagging camera motor.

Fig. 4 is a fragmentary view showing how the camera is geared down to 24 frames per second.

Fig. 5 is a fragmentary view of the sound tape of Fig. 3.

Fig. 6 is diagrammatic view of the electric circuit of the governor shown in Figs. 7 and 8.

Fig. 7 is an end view of a speed controlling governor for use with the invention.

Fig. 8 is a fragmentary sectional view of the governor shown in Fig. 7.

For convenience, the invention will first be described with relation to previously made motion pictures to which it is desired to add a sound accompaniment.

Referring now to Fig. 1, it will be noted that a sound tape or band 20 is provided for two purposes: In the first place, it serves as the means of recording sound; in the second place, it provides the means of controlling the projector motor so as to cause it to speed up to catch up with the speed of the motor which controls the sound reproducing mechanism. By the same token, it provides for synchronization of the means for recording sound and for taking motion pictures. More specifically, half of the width of the tape or band is used to impress control signals or areas 22 for the purpose of synchronization as above described. These control signals are uniformly spaced from each other. The relatively long space 24 between magnetic areas 22a and 22b is caused by reason of the stoppage of the camera at a time when the circuit to signal generator 26 was open while the recorder is still running. The tape is cut and spliced for editing at this point. There is shown in Fig. 1 a conventional recording head 28 which records sound on the upper half of the width of tape 20 as it is used in Fig. 1. Conductors 30 and 32 connect said recording head to a recording amplifier, not shown.

Signal generator 26 may be a one-thousand cycle unit which is connected by means of conductors 34 and 36 to a recording head 38. This recording head impresses the control signals upon tape 20 by electronic means but it will be understood that similar marks applied to the tape by carbon imprinting or by pencil or electrically or magnetically conductive paint may be used to accomplish the same purpose. In other words, any means may be provided for making intermittent electrical contact. A cam 40 on the shaft 42 of a motion picture camera acts upon a pivoted arm 44 which is held in engagement with said cam by means of tension spring 46. This pivoted arm 44 serves as a switch arm relative to contact member 48 and it will be noted that conductors 50 and 52 connect said contact and said switch arm to signal generator 26. The position of the cam will, of course, determine whether or not the circuit to the signal generator will be open or closed, and it is said cam which determines the spacing of the control signals 22 on tape 20. Since the cam is connected to the camera (assuming that the recorder and the camera were operating at the same time), the control signals on tape 20 will be synchronized with the motion picture film. Since the control signals are applied to the same tape which carries the sound track, it will be clear that said sound track will similarly be synchronized with the film, both for recording and reproducing purposes.

It will of course be understood that if during the recording of sound, the camera had stopped operating, those portions of the sound record which were recorded during the inoperation of the camera, would be clipped when editing the record.

It will be understood that these control signals may be applied to the sound film in any conventional manner. The drawing illustrates one method and another obvious method is the exact reverse of what the drawing shows. In this other method, a control signal would be applied to a previously prepared tape in a continuous, uninterrupted strip. The one-thousand cycle oscillator may be used for that purpose but its operation would not be interrupted by cam 40. Instead, said cam 40 would serve as an eraser for erasing equally spaced parts of said continuous control signal. The set-up would be exactly as shown in Fig. 1 with the sole exception that signal generator 26 would be suitable apparatus for operating an erasing head. Either method would produce the control signals shown in Fig. 1 and each complete revolution of cam 40 would produce one signal and one space as indicated by bracket 54.

Fig. 2 shows how tape 20 is used to synchronize projector motor 56 and sound reproducing motor 58. A pick up head 60 picks up the sound from the sound track on tape 20 and conductors 62 and 64 connect said pick up head through the usual channel to sound reproducing amplifier 66 which, in turn, is connected by means of conductors 68 and 70 to loud speaker 72. Where a motor for sound-reproducing apparatus 66 is required, said motor is shown in the drawing and designated by the reference character 58. A pick up head 74 is provided to pick up control signals 22 and conductors 76 and 78 connect said pick up head to an amplifier 80. This amplifier is connected by means of conductors 82 and 84 to a relay 86 which acts upon a pivoted arm 88. This arm serves as a switch arm with respect to opposing contacts 90 and 92, respectively, and it is attracted to contact 92 by tension spring 94. The relay, when energized, attracts the switch arm in the opposite direction and brings it into engagement with contact 90. A cam 96 is provided on shaft 98 of the projector and said shaft is connected to the projector motor 56. Fig. 2 shows said cam and said shaft connected to a sprocket 100 of the projecting mechanism. It will be seen that a pivoted switch arm 102 is held in engagement with cam 96 by means of a tension spring 104 and that it is movable between contact members 106 and 108, respectively. The cam tends to bring said switch arm into engagement with contact 106 and the spring tends to pull it into engagement with contact 108.

It will be noted from the drawing that switch arm 102 does not swing directly from contact 106 to contact 108 but lulls inbetween.

A conductor 110 connects contacts 90 and 108. Similarly, a conductor 112 connects contacts 92 and 106. A conductor 114 connects switch arm 88 to projector motor 56 and said motor is connected to a source of electric current by means of conductor 116, conductor 118, variable resistance 120, conductor 122. A switch 126 opens and closes the circuit. A conductor 128 connects with reproducer motor 58 and conductor 130 connects said reproducer motor 58 to conductor 116. The reproducer motor, therefore, receives a constant supply of electric current for constant operation.

Cam 96 and relay 86 cooperate with each other for the purpose of cutting the resistance 120 or governor into the projector circuit and short-circuiting said resistance out of said projector circuit. The effect, of course, is to cause the projector motor to lag when the resistance or governor is in circuit with it and to give that motor a burst of speed when the resistance or governor is short-circuited out of its circuit.

Fig. 3 shows another mechanism intended to record sound simultaneously with the photographing of motion pictures, the sound record and the motion pictures, each being recorded on separate film strips. A reel 132 is provided with a sound recording tape or film 134 feeding from it and to a second or takeup reel 136. Fig. 5 is an enlarged view of tape 134, and it will there be seen that it is provided with spaced perforations 138 along both side edges thereof. The object is to prepare by simple and inexpensive means a composite sound and picture record which may be reproduced by conventional means on a conventional sound-motion picture projector. In order that the sound record and the picture record may be in synchronism in the final composite, it is necessary that the picture film be recorded foot for foot with the recording of the sound film. The two separate records, that is the sound record and the picture record may then be sent to the laboratory for printing. Both records may be run together through an optical printing device so that the positive picture print will likewise carry a photographic record of the sound. While the sound track has been shown in Fig. 5 as running along the medial line of the film, it may, of course, be placed along one edge of the film, omitting one side of sprocket holes so that in printing the positive picture film, the sound track will appear on one edge of the picture film, thus adapting the composite record for use in a conventional sound, motion picture projector. Thus when the picture film is developed, the sound record film has been used to optically transfer sound to the picture film. The perforations 138 engage sprocket wheel 144 on shaft 146. As the film moves longitudinally of itself in the direction of arrow 148, the sprocket is caused to rotate. Wheels 150 and 152 frictionally engage the film and draw it forwardly in the direction of said arrow, either wheel being driven by a constant speed motor (not shown). Mounted on sprocket 144 is a brush 154 and as the film moves forwardly and the sprocket rotates, said brush will sweep around the axis of shaft 146 in clockwise direction as viewed in Fig. 3. It will be noted that a plurality of contact segments 156 are arranged concentrically of said shaft axis. These segments are equally spaced from each other and the brush is shown to be sufficiently wide so as to bridge the gap between any pair of adjacent contact segments. Hence, as the brush sweeps around in clockwise direction, it successively makes contact with the contact segments 156, thereby bridging them in the manner described.

A second commutator and brush assembly is provided for the camera operator by motor 174. Each segment has a conductor connected thereto and it will be noted that these conductors are marked with the letters A, B, C, D, E, F, G and H. A conductor 158 is connected through shaft member 160 to brush 154. It will be seen that conductors A to H inclusive are connected to a plurality of spaced contacts A1, B1, C1, D1, E1, F1, G1 and H1, respectively, which are arranged concentrically of shaft 162. A brush 164 is mounted on camera shaft 162 and as said shaft rotates, said brush is caused to engage contacts A1 to H1 respectively, each in turn. A variable resistance or governor 166 is provided similar to variable resistances which have above been described. A conductor 168 connects shaft 162 and brush 164 to said resistance or governor and a conductor 170 connects said resistance (or governor) to a source of electric current. Conductor 158 is also connected to said resistance (or governor) as Fig. 3 clearly shows. Conductor 172 connects conductor 168 to motor 174 and a conductor 176 connects said motor through switch 178 to a source of electric current. As the two brushes 154 and 164 swing around on their respective shafts, circuits will be made and broken with respect to resistance (or governor) 166 and said resistance (or governor) is thereby brought into the circuit and short-circuited out of the circuit.

One example of a more-or-less conventional electrical speed-controlling governor is illustrated in Figs. 6, 7 and 8. An insulated disc 180 is secured to motor shaft 146a.

One face of the disk carries two conductor rings 181 and 182. Brushes 183 and 184 are connected respectively by conductors 185—186 to resistance 187. Mounted on the opposite face of the disc 180 are flexible switch arm 188 and adjustable contact 189. The switch arm 188 is electrically connected with conductor ring 182 and the adjustable contact 189 is electrically connected to conductor ring 181. The switch arm has one end secured to the disc as at 190 while its opposite end is arranged normally to contact the adjustable contact 188 and thus maintain a closed circuit. When the motor, in operation, attains a predetermined speed the centrifugal force will overcome the tendency of the flexible switch arm to maintain its contact and will move its free end to the dotted line position shown in Fig. 7, thus breaking the circuit and causing the current to pass through the resistance 187. Obviously, the governor may be substituted for the variable resistance shown in Figs. 2 and 3.

Having thus described my invention, what I claim as new and desire to secure by Letters Patent, is:

1. The combination with a sound record film having equally spaced control signals, of a motion picture projector, a variable speed electric motor for driving said projector, a first two-way switch operatively connected with the projector mechanism and comprising a first pivoted switch arm swingable between a first electrical contact and a second electrical contact, spring means for yieldingly biasing said first switch arm toward closed-circuit position with said first contact, means on the projector for intermittently biasing the said first switch arm to a closed-circuit position with said second contact, said first two-way switch being constructed and arranged momentarily to close one of said circuits, then to remain open for part of the cycle, then momentarily to close the other said circuits and then to open again, the duration of the closed circuits in each case being very short relative to the long duration of the open circuits; a motor for driving the sound record film, means for said control signals to operate a second two-way switch, said second two-way switch comprising a pivoted switch arm constantly oscillating between a third electrical contact and a fourth electrical contact, said switch being open only during the time it takes to travel back and forth between both said third and fourth contacts, an electrical speed governor, said governor being operatively associated with the projector motor and adjusted to drive the picture film at a speed slower than the relative speed of travel of the sound film, electric circuit connections between an electric power source, the projector motor, the sound record motor, said electrical speed governor, said first two-way switch and said second two-way switch, whereby to short-circuit the governor whenever the speed of travel of the picture film lags behind the traveling speed of the sound film, thereby to speed up the travel of the picture film to be in synchronism with the movement of the sound film, said electrical interconnection being such that the projector motor will speed up only when the governor is shorted out of the circuit by both said switches closing in phase.

2. The combination set forth in claim 1, wherein said electrical speed governor is a variable resistance connected in series with the projector motor and the power source.

References Cited in the file of this patent

UNITED STATES PATENTS

| | | |
|---|---|---|
| 2,076,202 | Lewellen et al. | Apr. 6, 1937 |
| 2,079,223 | Murdock | May 4, 1937 |
| 2,084,907 | Groot | June 22, 1937 |
| 2,503,083 | Waller | Apr. 4, 1950 |
| 2,637,785 | Charlin | May 5, 1953 |
| 2,693,127 | Ortman | Nov. 2, 1954 |

FOREIGN PATENTS

| | | |
|---|---|---|
| 341,152 | Great Britain | Jan. 15, 1931 |
| 343,811 | Great Britain | Feb. 26, 1931 |